Aug. 29, 1939. C. A. RIVARD 2,171,322
HOT LIQUID CONTAINER
Filed March 11, 1938
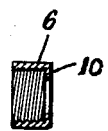 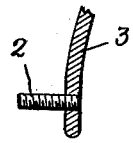  
Fig.2. Fig.3. Fig.4. Fig.5.
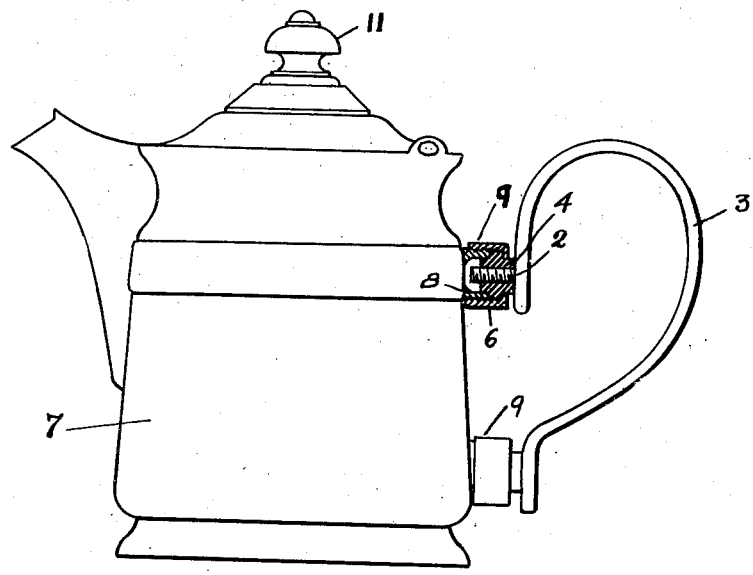
Fig.1.
INVENTOR
Charles A. Rivard
BY H. L. Kirkpatrick
his ATTORNEY Patented Aug. 29, 1939

2,171,322

UNITED STATES PATENT OFFICE 2,171,322

HOT LIQUID CONTAINER

Charles A. Rivard, Providence, R. I., assignor to Reed & Barton, Taunton, Mass., a corporation of Massachusetts Application March 11, 1938, Serial No. 195,303

2 Claims. (Cl. 16—119)

The present invention relates to containers for hot liquids, such as coffee pots, tea pots and the like, provided with handles, knobs or like projecting parts intended to be gripped by the hand in manipulating the container.

Such containers are commonly constructed entirely of high heat-conducting material, such as metal, and are subject to the disadvantage that heat from the liquid is transmitted rapidly to all parts of the container, making the handles and knobs too hot to be touched by the bare hand. To remedy this disadvantage, the containers are sometimes equipped with handles composed of non-heat-conducting material such as wood, fibre, Bakelite and the like, but such handles detract from the ornamental appearance of the container and lack the strength of a metal handle.

It is an object of the present invention to provide a container having a body portion and manipulating handles, knobs or the like of heat conducting material joined together by one or more joints or couplings which are insulated against transmission of heat from the container body to the handle. It is a further object of this invention to provide such a container in which insulating parts are entirely or substantially concealed from view. A further object is to provide such a container in which the handle is readily detachable from the body portion to facilitate cleaning. Other objects and advantages of the invention will be apparent from the ensuing description and from the annexed drawing in which:

Fig. 1 is a side elevation, partly in section, of a container having a detachable handle equipped with insulated couplings of the present invention;

Figs. 2 to 5 are views of parts of the insulated coupling shown in Fig. 1, Fig. 2 being a section through the coupling sleeve, Fig. 3 a side elevation of the insulator attachment stud shown secured in a section of the handle, Fig. 4 a section view of the insulator and Fig. 5 a section view of the coupling boss.

The container shown in Fig. 1 has a body portion 7 of metal and a metal handle 3 removably secured to the body portion 7 by two insulated couplings 9 of identical construction. As shown, each coupling 9 comprises an insulator 4 secured to the handle, an internally threaded sleeve 6 mounted on the insulator 4 and a hollow externally threaded boss 8 projecting from the container body 7.

The insulator 4, which is made of compressed fibre, Bakelite or similar heat insulating material, is cylindrical in shape with an annular rib 5 projecting centrally of its surface and is secured to the handle 3 by the stud 2 passing through a central bore in the insulator 4 and threaded or otherwise secured in a suitable aperture in the handle 3. The stud 2 and bore of the insulator may be provided with co-operating screw threads as shown in Figs. 3 and 4 for removably securing the insulator tightly on the stud. The sleeve 6 has a cylindrical threaded bore of a diameter equal to or slightly greater than the diameter of the circular rib 5 on the insulator 4 and has an annular shoulder 10 at one end providing a circular opening with a diameter less than that of the rib 5 but slightly larger than the diameter of the main body portion of the insulator 4. The sleeve 6 is rotatably and slidably secured to the handle 3 by the insulator 4 as shown in Fig. 1 with the shoulder 10 located between the rib 5 and the handle, the rib acting as a stop limiting lateral movement of the shoulder 10 along the insulator.

The hollow coupling boss 8 which is secured to or formed integral with the container body 7, is adapted to fit within the sleeve 6, having an external thread to receive the internal thread on the sleeve 6 and a bore having a diameter slightly greater than that of the insulator 4 but less than that of the rib 5. As the sleeve 6 is threaded over the boss 8, the outer end of the insulator 4 is received in the bore of the boss up to the rib 5 which abuts against the outer end of the boss, thus preventing further penetration of the insulator into the bore. Further tightening of the sleeve 6 moves the shoulder 10 forward until it contacts the other side of the rib 5, thus leaving a small space between the shoulder 10 and the handle 3. The boss 8 may be of metal and the bore is of sufficient depth so that the stud 2 will not contact it when the insulator rib 5 is pressed against the outer end of the boss. The sleeve 6 is preferably of metal matching that of the body and handle of the container.

The coupling 9 thus provides a firm detachable joint between the handle and the body of the container which is effectively insulated against transmitting heat from the body portion to the handle since metal parts 6 and 8 do not contact the handle and are separated from the metal stud 2 by the heat insulator 4. The construction provides a strong joint since the supporting connections to the body and handle are of metal, the supporting strength of the stud 2 being enhanced by the insulator 4 which surrounds it and bears against the handle. Furthermore, the metal sleeve 6 effectively shields the insulator from view, enclosing it except for the small space between the shoulder 10 and the handle where, due to the depth of the space, the presence of the insulator is not apparent to the eye.

Other manipulating parts than the main handle, such for example as the knob 11 on the cover, may, if desired, be fixedly or removably connected to the container by insulated joints or couplings of the present invention.

It will be apparent that modifications in details of the preferred construction shown may be made without departing from the spirit and scope of the present invention. The term "handle" as employed in the appended claims is to be understood as including knobs or like projections for manipulation of the container.

I claim:

1. A heat insulated connection between a handle and a container comprising an insulator resistant to heat transmission fixed to one of said connected parts, a rib on the insulator spaced from said connected part, a boss on the other of said connected parts, and a sleeve secured to the boss and having a reduced end securing said sleeve to said insulator between said rib and first named connected part.

2. A heat insulated connection between a handle and a container comprising an insulator resistant to heat transmission fixed to one of said connected parts, a rib on the insulator spaced from said connected part, a threaded sleeve having a reduced end rotatably mounted on the insulator between the rib and said connected part, and a boss on the other of said connected parts provided with a thread mating with the thread on the sleeve to removably secure the sleeve to the boss.

CHARLES A. RIVARD.